(12) United States Patent
Temkin et al.

(10) Patent No.: US 7,194,888 B1
(45) Date of Patent: Mar. 27, 2007

(54) REDUCING DRIVE FILE DEVELOPMENT TIME FOR A VEHICLE ROAD TEST SIMULATOR

(75) Inventors: Mikhail Temkin, Troy, MI (US); Ryan A Vaughan, Macomb, MI (US); Yung-Li Lee, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/401,194

(22) Filed: Apr. 10, 2006

(51) Int. Cl.
*G01M 17/04* (2006.01)
(52) U.S. Cl. ............................ 73/11.04; 73/669
(58) Field of Classification Search ............. 713/11.04, 713/11.07, 669, 670, 117, 123, 865.6; 701/29
See application file for complete search history.

(56) References Cited

U.S. PATENT DOCUMENTS

| | | | |
|---|---|---|---|
| 5,003,819 A * | 4/1991 | Koopmann | 73/146 |
| 5,610,330 A | 3/1997 | Fricke et al. | |
| 5,877,414 A * | 3/1999 | Rui et al. | 73/146 |
| 5,880,362 A * | 3/1999 | Tang et al. | 73/146 |
| 5,900,542 A | 5/1999 | Fricke et al. | |
| 5,942,673 A * | 8/1999 | Horiuchi et al. | 73/11.04 |
| 6,112,586 A * | 9/2000 | Fricke et al. | 73/146 |
| 6,134,957 A * | 10/2000 | Fricke et al. | 73/146 |
| 6,192,745 B1 * | 2/2001 | Tang et al. | 73/146 |

OTHER PUBLICATIONS

"Criteria to Determine the Necessity of Data Acquisition for RTS Drive File Development due to Vehicle Parameter Changes," Ryan Vaughan, Mikhail Temkin and Yung-LI Lee, 2005 SAE International, pp. 1-8.

* cited by examiner

*Primary Examiner*—Eric S. McCall
(74) *Attorney, Agent, or Firm*—Ralph E. Smith (57) ABSTRACT

A method of vehicle suspension testing includes conducting actual road testing of a vehicle including collecting data, and generating a drive file from the collected data for road test simulation. A vehicle suspension parameter is changed to result in a changed vehicle. Initial simulated road testing of the changed vehicle is conducted using the drive file, and results from the simulated and actual road testing are compared using acceptability criteria to determine whether to conduct further actual road testing of the changed vehicle before conducting further simulated road testing of the changed vehicle in response to the changed suspension parameter. Further simulated road testing of the changed vehicle is conducted if the acceptability criteria are met. Otherwise, further actual road testing of the changed vehicle is first conducted to develop a new drive file for use with additional simulated road testing of the changed vehicle.

16 Claims, 8 Drawing Sheets

*FIG. 14*  Pct. of MP Rig Damage

REDUCING DRIVE FILE DEVELOPMENT TIME FOR A VEHICLE ROAD TEST SIMULATOR

FIELD OF THE INVENTION

The present invention relates generally to automotive durability testing, and more particularly to testing of a vehicle suspension.

BACKGROUND OF THE INVENTION

It is well known to test automotive vehicles for durability during various phases of vehicle development. A two-stage approach is currently used in durability testing of a vehicle suspension, and includes actual vehicle road tests at a proving ground and simulated road testing in a laboratory. In late phases of vehicle development, requests are frequently made to tune a vehicle suspension for better performance by changing various vehicle suspension parameters, like sway bar diameter or spring rate. Suspension parameter changes affect the loads on and durability of various vehicle components, and the two-stage proving ground and test rig process is typically used to assess each change. But it is time consuming and labor intensive to test the vehicles at the proving ground. Accordingly, use of the two-stage vehicle suspension testing approach for every change, no matter how minor, unnecessarily delays and increases the costs of the vehicle development process.

SUMMARY OF THE INVENTION

In one presently preferred implementation of a method of vehicle suspension testing, an initial actual road test of a vehicle is conducted and corresponding data is collected. From the collected data, a drive file is generated for a subsequent road test simulation of the vehicle. Thereafter, some vehicle suspension parameter is changed to result in a changed vehicle. An initial simulated road test of the changed vehicle is conducted using the drive file, and results from the simulated road test are compared with results from the actual road test. Acceptability criteria are used in the comparison to determine whether to conduct further actual road testing of the changed vehicle before conducting further simulated road testing of the changed vehicle in response to the changed parameter of the suspension. Preferably, the following acceptability criteria may be used: frequency content of vehicle loading, load cycles-at-level or cumulative exceedance, relative severity of loading damage in each coordinate direction, and interaction of each coordinate direction in forming multi-axial loading conditions (damage spheres). Further simulated road testing of the changed vehicle is conducted if the acceptability criteria are met. Otherwise, further actual road testing of the changed vehicle is first conducted to develop a new drive file for use with additional simulated road testing of the changed vehicle. Accordingly, changes can be reliably tested in a test laboratory using a road test simulation rig without having to conduct actual road load data acquisitions on the vehicle at a proving ground.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
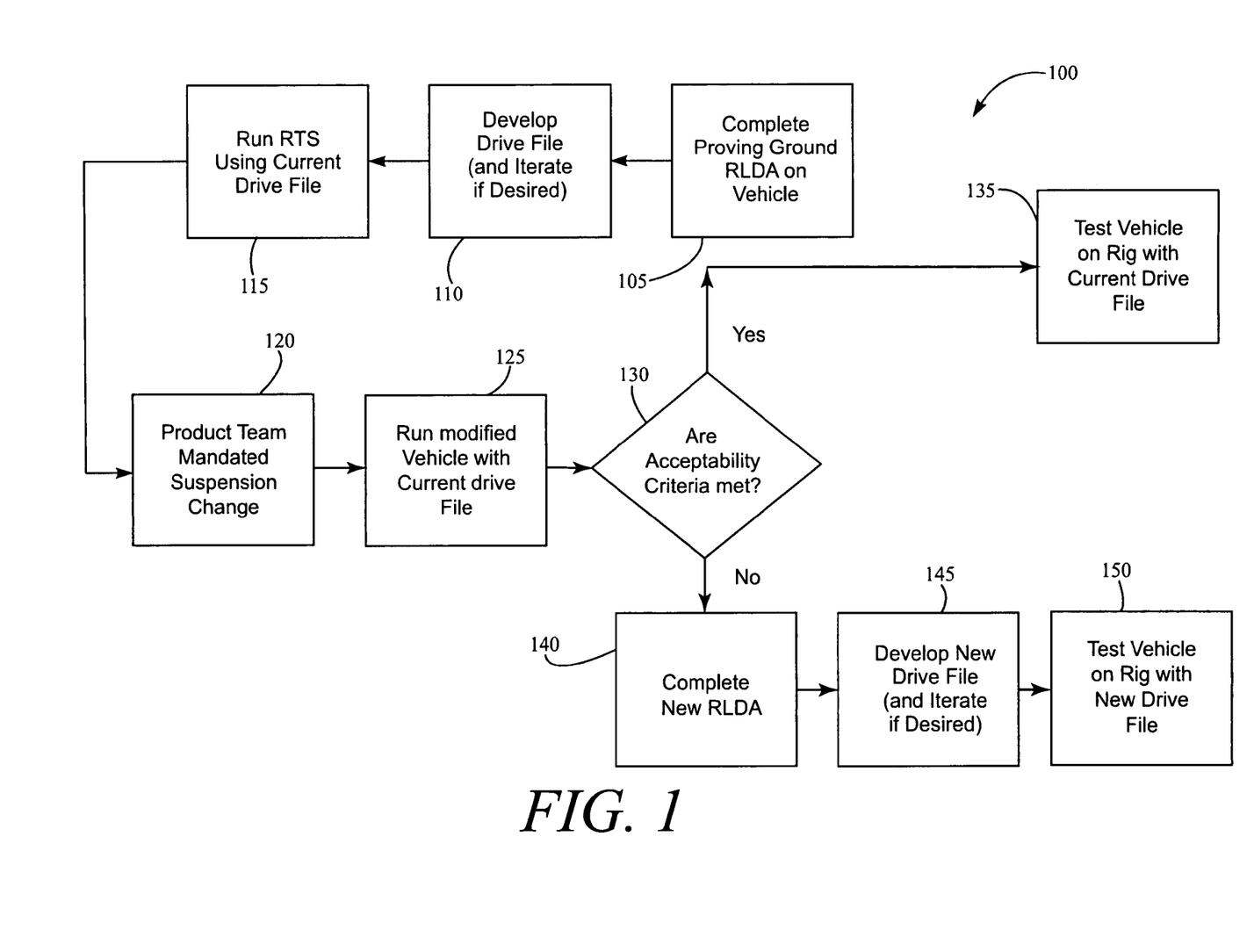
FIG. 1 is a flow chart illustrating an embodiment of a method of testing a vehicle suspension.

Referring in more detail to the drawings, FIG. 1 illustrates a method 100 of vehicle suspension testing. In general, vehicle development may occur over several different phases including prototype, pre-production, production, and post-production phases. During each phase, a vehicle may be tested at a proving ground to assess different aspects of vehicle performance, such as performance of a vehicle suspension and the effect of suspension performance on other aspects of the vehicle, such as suspension components and vehicle body components. The method 100 is used to assess changes in vehicle suspension parameters based on correlation between actual and simulated road test data acquisitions, and whether those changes can be reliably durability tested in a test laboratory using a road test simulation (RTS) rig without having to conduct actual road load data acquisition (RLDA) on the vehicle.

Referring in general to step 105, proving ground RLDA is carried out by completing actual road testing of a vehicle whose suspension is to be durability tested according to a suspension durability schedule. Typically, different proving ground durability schedules are specified for different types of vehicles. For example, a compact car will have one type of suspension durability schedule, whereas a truck will have a relatively more rigorous suspension durability schedule. But regardless of vehicle type, during initial proving ground testing of a vehicle suspension, a test vehicle is equipped with sensors such as transducers, driven around test tracks and over rough terrain, and data from the sensors is collected.

But, as shown at step 110, before simulated durability testing of the vehicle is conducted on an RTS rig, the road load data acquisition from the proving ground is used to develop an original drive file for use in RTS of the vehicle on the RTS rig. The sensor data from the test vehicle, in the form of load-time histories, is compiled into a computer "drive file" for later use in conducting an RTS on an RTS rig. At step 110, the proving ground test data are compared to initial simulated test data collected from the vehicle on the RTS rig. If the results do not correlate, RTS variables may be adjusted until the results do correlate so that complete RTS durability testing can be carried out. Such adjustment is known to those skilled in the art as performing drive file iteration, and yields an iterated drive file.

At step 115, suspension durability testing is completed on the RTS rig according to a complete RTS vehicle durability schedule using the original drive file or an iterated drive file if desired. Such RTS simulated road testing is used to accelerate the suspension testing process because proving ground testing can be very time consuming and relatively expensive.

At step 120, a change in a vehicle suspension parameter is made to the test vehicle, for example as mandated by a vehicle design team. Common suspension parameter changes include changes to front or rear spring rates, front or rear sway bar diameter, shock valving or damping coefficients, bushing rates or rubber durometer, vehicle corner weights or weight distribution, gross vehicle weight rating, suspension component geometry, jounce bumper tuning, or the like. Those of ordinary skill in the art will recognize that any other suspension parameter changes may be made.

At step 125, the vehicle with the changed configuration is evaluated by running an initial RTS of the changed vehicle on the RTS rig using the current drive file. The current drive file is the original drive file if no drive file iterations have been performed, otherwise it is the iterated drive file.

At step 130, the data collected from the RTS run of step 125 is observed and compared with results data from the proving ground RLDA actual road testing. The comparison is made using one or more of certain acceptability criteria to determine whether to conduct further actual road testing of the changed vehicle before conducting further simulated road testing of the changed vehicle in response to the changed parameter of the suspension. In one implementation, exemplary acceptability criteria may include frequency content of vehicle loading, load cycles-at-level or cumulative exceedance, relative severity of loading damage in each coordinate direction, and interaction of each coordinate direction in forming multi-axial loading conditions. Preferably all, but any one or any combination, of the aforementioned criteria may be used in making the step 130 determination, and the description of the method validation is incorporated into the description of this step by reference.

If, at step 130, it is determined that the acceptability criteria are met, then the simulated road testing of the vehicle in its changed configuration may be conducted as shown at step 135. In other words, no providing ground road load data acquisition is carried out, because the suspension changes can be reliably durability tested in a laboratory using the RTS rig.

Otherwise, if the acceptability criteria are determined to have not been met, then, at step 140, another proving ground road load data acquisition is carried out on the vehicle in its changed configuration. In other words, further actual road testing at a proving ground is conducted to establish additional load history data.

Subsequently, at step 145, a new drive file is developed using the additional proving ground load history data. Again, if the results do not correlate, RTS variables may be adjusted until the results do correlate so that complete RTS durability testing can be carried out. Thereafter at step 150, additional simulated suspension durability road testing may be completed for the vehicle on the RTS rig using the new drive file.

The method 100 was validated using a truck in its production configuration. Actual vehicle road test data acquisition was carried out on the instrumented production truck using a proving ground durability schedule for the production truck. Three passes of road load data acquisition were carried out and sensor data from each pass was used to generate a single baseline drive file for subsequent use in laboratory suspension testing.

Then, suspension parameters of the truck were changed. For purposes of evaluating the present method, a 20% change in rear spring rate was made to the production truck, with no change to any other suspension components. Independently, the method was also further evaluated by making a 10% change in front sway bar diameter, with no change to any other suspension components.

Next, actual road testing of the changed configurations of the vehicle were conducted to establish proving ground test data for the changed configurations. Three passes of road load data acquisitions were carried out for each of the changed configurations. Sensor data from the spring rate change passes were used to generate a single spring rate change drive file for subsequent use in laboratory suspension testing. Likewise, sensor data from the sway bar change passes were used to generate a single sway bar change drive file for subsequent use in laboratory suspension testing.

Subsequently, simulated road test data acquisition of the vehicle was conducted to establish road test simulation data for comparison to the actual road test data from the proving ground. Accordingly, the truck was mounted on an MTS 329 Light Truck Simulator rig and RTS runs were performed for the three different vehicle configurations including the production configuration, the spring rate change configuration, and the sway bar change configuration. Three sets of vehicle responses were collected according to the following RTS runs: (1) production drive file used during the RTS run with no suspension component changes to the truck; (2) production drive file used during the RTS run with spring rate and sway bar change configurations; and (3) drive file iterations were performed to meet RTS criteria with the aforementioned changed components installed on the truck.

But before the vehicle was durability tested on the RTS rig, the proving ground test data was compared to data observed from the truck on the RTS rig. If the results did not correlate, then test variables were adjusted until the results did correlate. The root-mean-square (RMS) of the error between desired and achieved road data response is preferably less than 2% of the absolute maximum of the desired road data response. Additionally, the absolute maximum error between desired and achieved road data response is preferably less than 10% of the absolute maximum of the desired road data response. Allowance may be made for errors due to a phase shift or small amplitudes of data.

After the RTS runs, RTS vehicle response data sets were compared to the corresponding proving ground data sets to validate frequency content of the vehicle loading, cycles-at-level or cumulative exceedance, relative severity of loading damage in each coordinate direction, and interaction of each coordinate direction in forming multi-axial loading conditions.

For every proving ground and RTS run, power spectral density (PSD) analysis was performed on each channel to accurately assess the frequency content of each load-time history. PSD analysis is used to determine dominant frequencies present in each observed channel and to observe whether such frequencies remain relatively constant from run to run on each channel. If peak or maximum power frequencies of each PSD are within approximately 0.1 to 1.0 Hz and, more preferably about 0.5 Hz, of the baseline data set, then the difference in frequency content of the two samples is considered to be negligible. Additionally, a check is conducted to ensure that the peak power frequencies follow the same order wherein the frequencies with the highest power are the same, as are that of the second highest power, and so forth. FIGS. 2 through 5 are PSD plots of power (in $lb^2/Hz$) versus frequency (in Hz).

Figure 2:
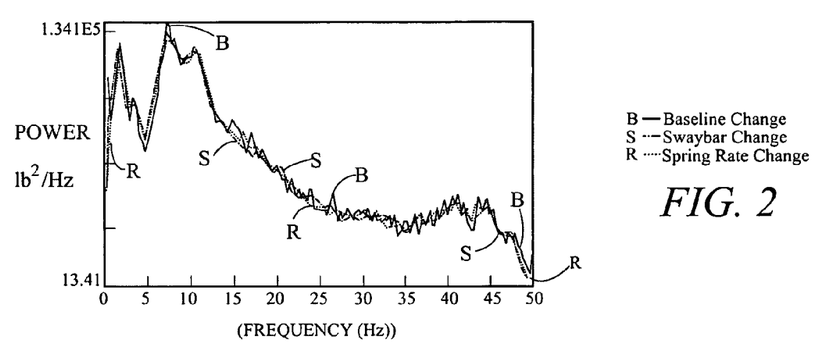
FIG. 2 is a power spectral density plot of vertical spindle loads taken during a proving ground data acquisition of a production truck with a base configuration, a sway bar changed configuration, and a spring rate changed configuration.
Figure 3:
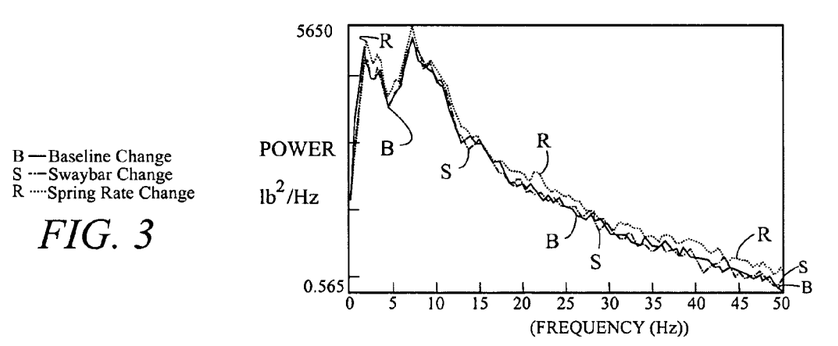
FIG. 3 is a power spectral density plot of vertical body/box mount loads taken during a proving ground data acquisition of a production truck with a base configuration, a sway bar changed configuration, and a spring rate changed configuration.

FIGS. 2 and 3 are exemplary samples representative of all of the PSDs of all vehicle measurement locations and corresponding channels from the vehicle data collected at the proving ground. The plots B, S, R of FIGS. 2 and 3 illustrate that there is only a minimal shift in the dominant frequencies for both the sway bar and spring changed configurations S and R.

Figure 4:
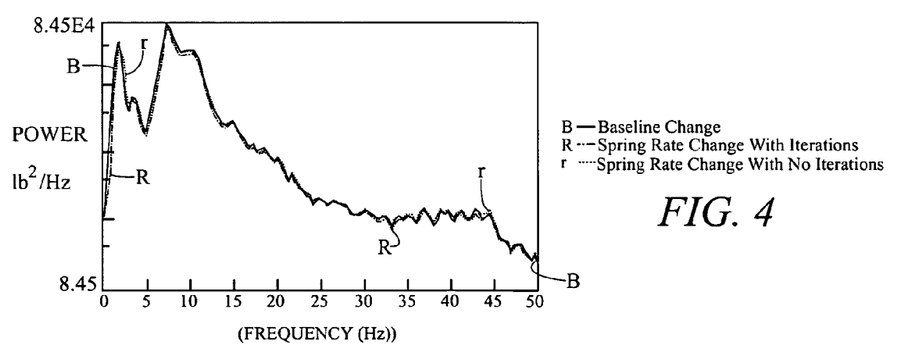
FIG. 4 is a power spectral density plot of vertical spindle loads taken during a road test simulation data acquisition of a production truck with a base configuration, a spring rate changed configuration without drive file iteration, and a spring rate changed configuration with drive file iteration.
Figure 5:
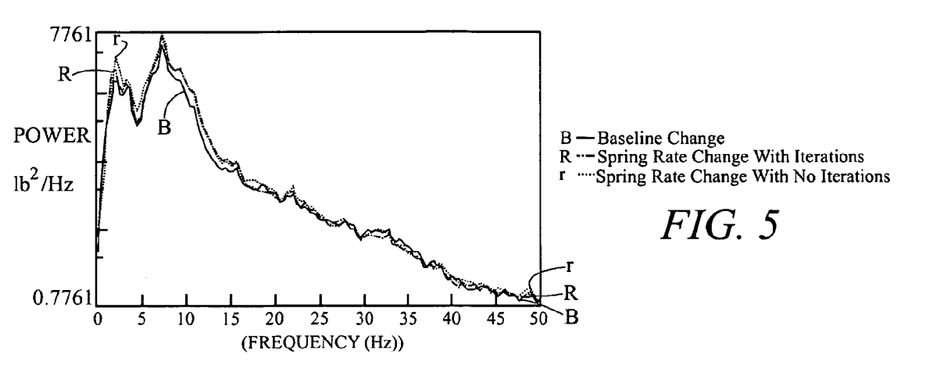
FIG. 5 is a power spectral density plot of vertical body/box mount loads taken during a road test simulation data acquisition of a production truck with a base configuration, a spring rate changed configuration without drive file iteration, and a spring rate changed configuration with drive file iteration.

Similarly, and referring now to FIGS. 4 and 5, the frequency content of the data taken from the RTS rig runs was consistent through all the variations in suspension parameters and rig iteration procedures. FIGS. 4 and 5 show typical RTS rig PSD analysis plots B, R, r of the spring rate changed configurations without drive file iteration r and with drive file iteration R in comparison to the base configuration B. As can be seen from the plots B, R, r there is very little change from run-to-run of the peak frequency content of each load-time history. The body/box mount plot of FIG. 5 does exhibit some change in the power at each frequency due to the higher compliance in sheet metal components, however the plot maximums are at the same frequencies so any differences may be noted when making comparisons using load damage severity based criteria.

Another criterion in determining whether there is a significant change in the load-time histories between various vehicle configurations is the number of loading cycles-at-level within a given range of load in pounds, and is preferably analyzed using cumulative exceedance analysis. While load damage severity analysis does provide some of the same information, it is possible that the aggregation of an entire load-time history into a single damage severity number could lead to a misrepresentation of the most significant load levels. Therefore, by also comparing cumulative exceedance diagrams, this possibility may be reduced. If cumulative exceedance plots track very closely from test run to test run, it may be considered highly unlikely that any aggregation error will occur and provides confidence that the damage severity comparisons will accurately predict any true differences in loading due to the changes in suspension parameter(s). Additionally, if differences are present on the cumulative exceedance diagrams, it is much easier to ascertain the load level and cycle count of the difference, something that can be masked by pseudo-damage (severity) analysis alone.

Figure 6:
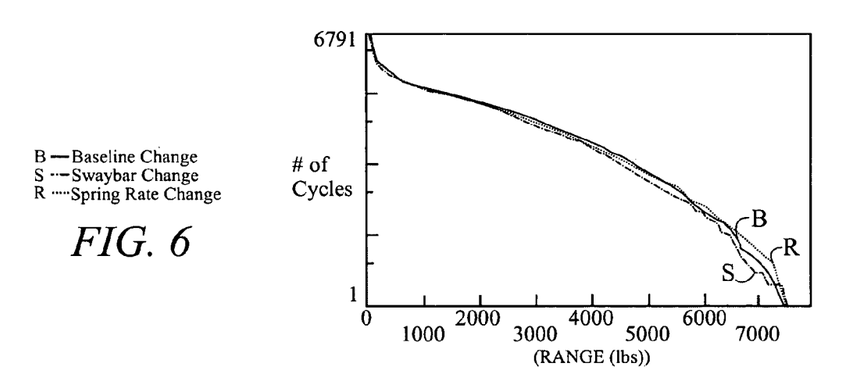
FIG. 6 is a cumulative exceedance plot of vertical spindle loads taken during a proving ground data acquisition of a production truck with a base configuration, a sway bar changed configuration, and a spring rate changed configuration.
Figure 7:
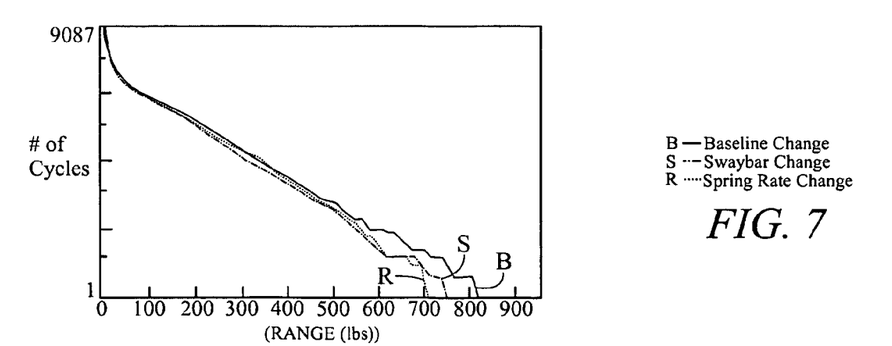
FIG. 7 is a cumulative exceedance plot of vertical body/box mount loads taken during a proving ground data acquisition of a production truck with a base configuration, a sway bar changed configuration, and a spring rate changed configuration.

FIGS. 6 and 7 illustrate representative cumulative exceedance diagrams for proving ground spindle and body/box mount loads, respectively, taken during a proving ground data acquisition of a production truck with a base configuration B, a sway bar changed configuration S, and a spring rate changed configuration R. From the figures, it is evident that the exceedance plots B, S, R maintain the same general distribution for each road surface and suspension configuration. There is some variation in the range of the very low cycle regions, however damage severity calculations will be able to adequately assess these differences. Once again, the body/box mount channels showed more variability than the spindle loads.

Figure 8:
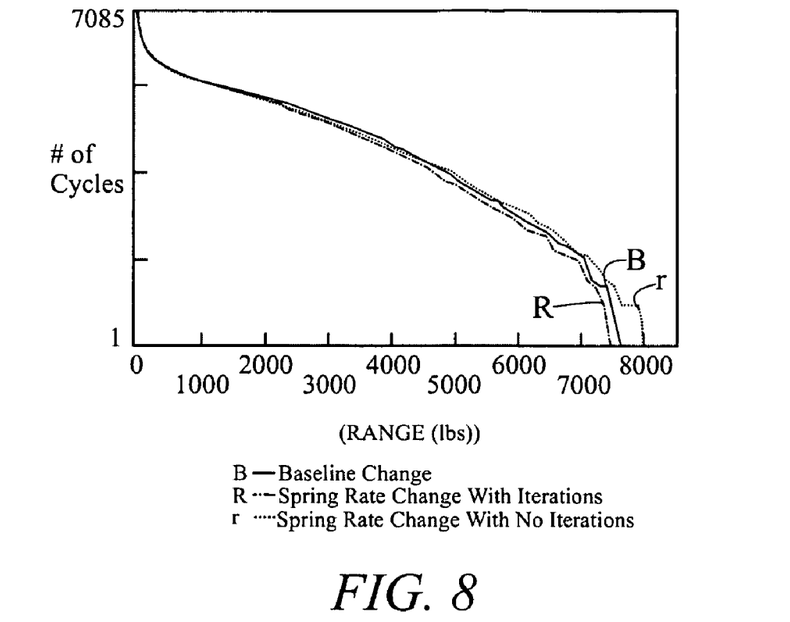
FIG. 8 is a cumulative exceedance plot of vertical spindle loads taken during a road test simulation data acquisition of a production truck with a base configuration, a spring rate changed configuration without drive file iteration, and a spring rate changed configuration with drive file iteration.
Figure 9:
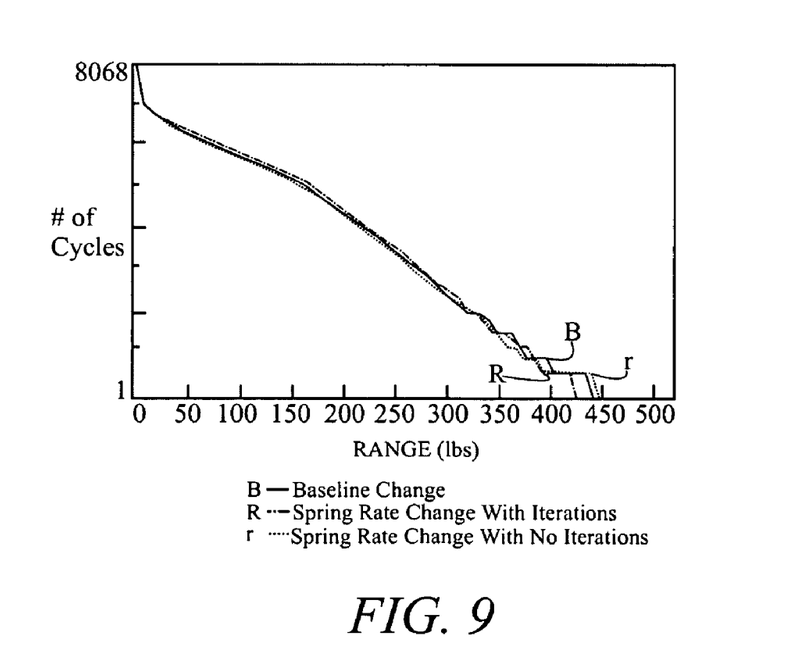
FIG. 9 is a cumulative exceedance plot of vertical body/box mount loads taken during a road test simulation data acquisition of a production truck with a base configuration, a spring rate changed configuration without drive file iteration, and a spring rate changed configuration with drive file iteration.

Similarly, FIGS. 8 and 9 show representative RTS rig cumulative exceedance plots B, R, r of the spring rate changed configurations without drive file iteration r and with drive file iteration R in comparison to the base configuration B. As can be seen from the plots B, R, r and as was the case with the data from the proving ground, for the high cycle count loading conditions the exceedance plots track nearly identically. Again, there is some variation noted in the lower cycle ranges indicating that the use of a non-iterated drive file on a vehicle with a parameter change could potentially be more severe than actually required. Additionally, the deviation of the non-iterated data set r is due mostly to variation in the maximum load collected, which is still within the assumed 10 percent variability due to measurement error.

Figure 10:
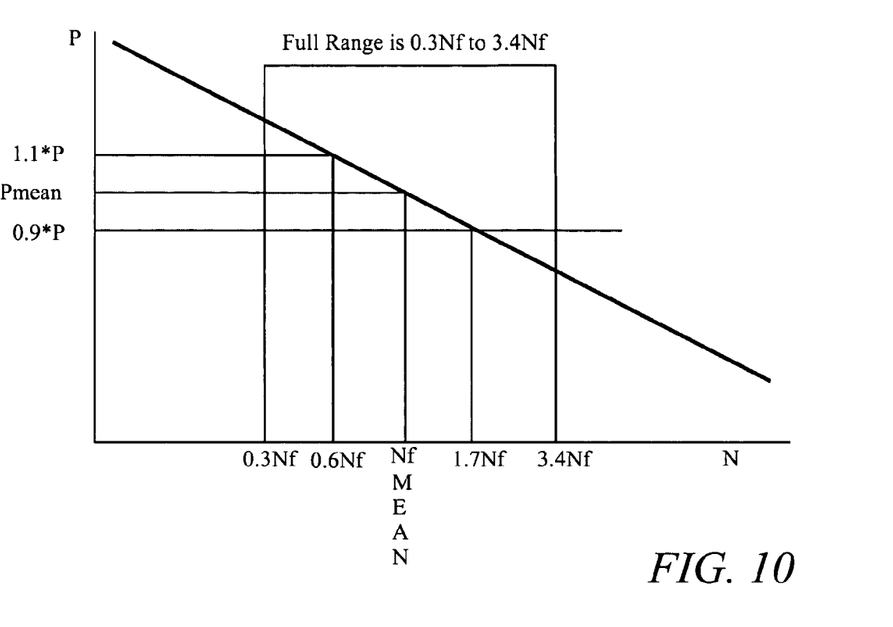
FIG. 10 is a P-N plot of load versus number of cycles to failure, plotted by respective ratios instead of absolute values, and used in development of a failure criterion used in the vehicle suspension testing method of FIG. 1.

Because most data for box mount loads was collected using tri-axial load cells, it was desirable to verify via uniaxial pseudo-damage analysis that the load damage severity in any single direction did not change drastically from one run to another. Two factors were taken into account in determining a severity failure criterion for use with this uniaxial pseudo-damage tool. First, it was assumed that with any load-cell-based data acquisition that there can be up to +/−10% variation in load simply due to standard measurement and acquisition system error. Using a standard load-life curve with an assumed slope of −0.2, the standard error translates into a factor of 1.7 variation in predicted fatigue life from nominal loading conditions. Second, and in addition to the standard error, there is inherent variability in fatigue life even under the most controlled laboratory conditions. Acceptable variability in fatigue life is in the range of approximately 50% to 200% of the nominal life for any given load. As shown in FIG. 10, when these two factors are combined through superposition, variation from 33% to 300% could be observed even if all other conditions remained unchanged.

For this reason, a "factor of two" failure criterion was chosen when performing run-to-run comparisons of pseudo-damage calculations. In other words, it is assumed that if the load severity from a changed configuration test run on any given channel is between 50 percent and 200 percent of load severity from the base configuration run, then no significant difference exists between the changed configuration loading and the base configuration loading.

Figure 11:
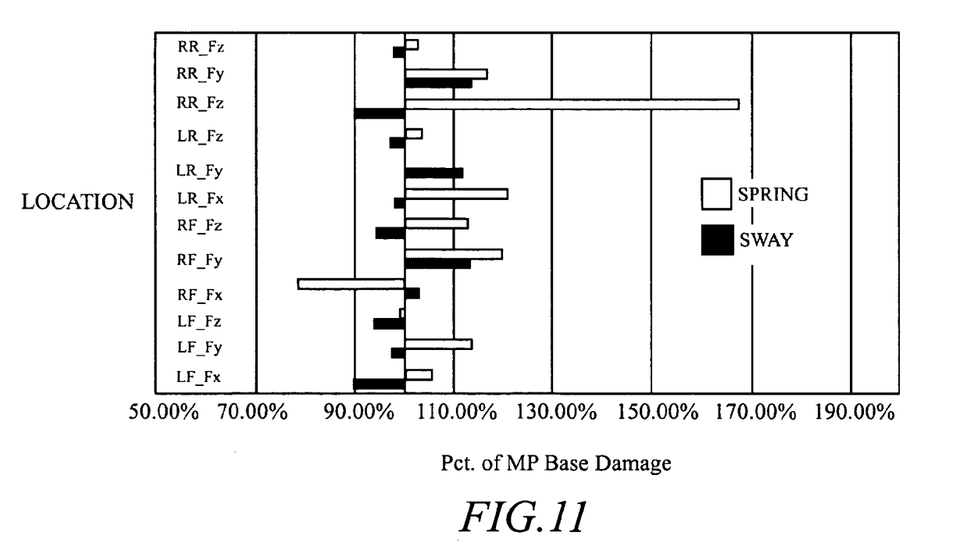
FIG. 11 is a horizontal bar graph of spindle load pseudo-damage taken during a proving ground data acquisition of a production truck with a spring rate changed configuration and a sway bar changed configuration as a percentage of base configuration pseudo-damage.
Figure 12:
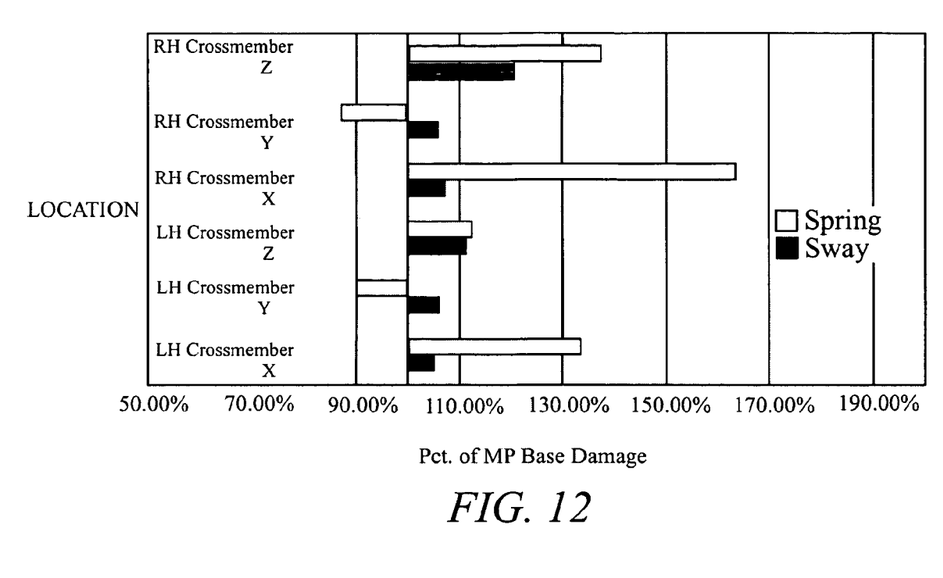
FIG. 12 is a horizontal bar graph of body/box mount load pseudo-damage taken during a proving ground data acquisition of a production truck with a spring rate changed configuration and a sway bar changed configuration as a percentage of base configuration pseudo-damage.

FIGS. 11 and 12 show representative examples of uniaxial pseudo-damage severity comparisons between the spring rate and sway bar changed configuration data sets from the proving ground. The baseline severity is that of the base vehicle configuration at the proving ground (100% of base) and all other changed configurations are shown as deviations from that level. The data for FIGS. 11 through 14 are plotted by the following vehicle sensor locations and measured coordinates: right rear RR, left rear LR, right front RF, left front LF, right-hand and left-hand cross members, and the x, y, and z load coordinate directions. The data are plotted as excursions from the base configuration proving ground data. Additionally, the damage severity numbers used for comparison are averages over all the runs completed with any given setup. Also, all calculations were performed using a standard load-life curve with an assumed slope of −0.2 since all severity data was used for relative comparisons between the different runs, and not absolute damage information. As can be seen from the bars, all severity values are within the "factor of two" failure criterion set forth above. Also, those channels that show the largest excursions are not in the principal (vertical) loading direction.

Figure 13:
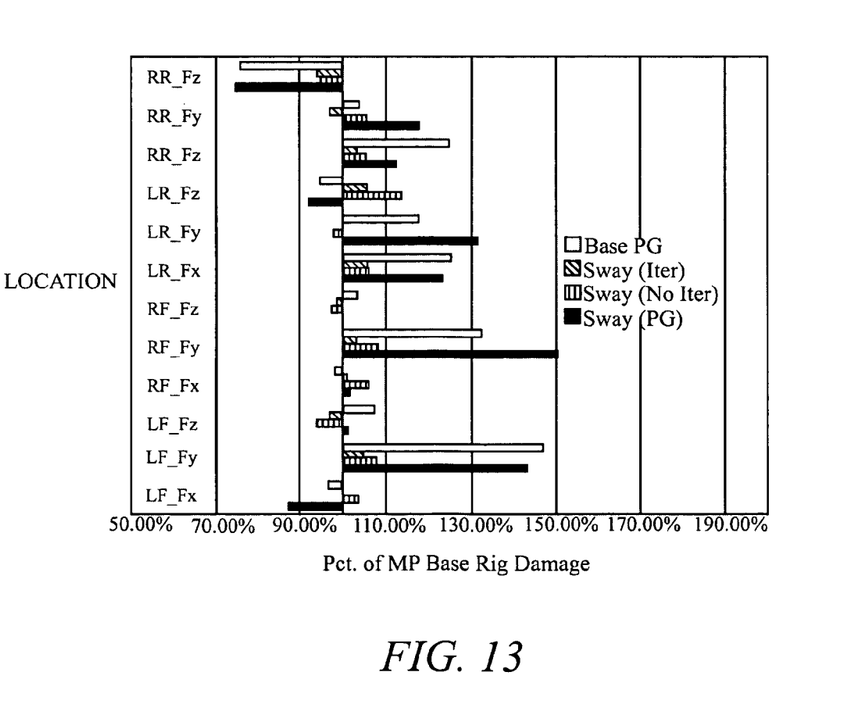
FIG. 13 is a horizontal bar graph of spindle load pseudo-damage for a proving ground data acquisition of a production truck with a base configuration and a sway bar change configuration, and for a road test simulation data acquisition of a production truck with a sway bar changed configuration with and without drive file iteration as a percentage of base configuration pseudo-damage.
Figure 14:
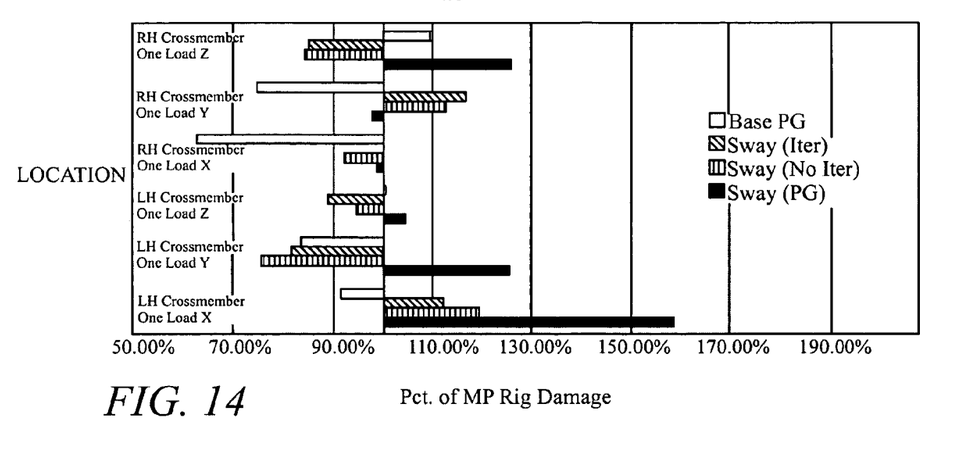
FIG. 14 is a horizontal bar graph of body/box mount load pseudo-damage for a proving ground data acquisition of a production truck with a base configuration and a spring rate change configuration, and for a road test simulation data acquisition of a production truck with a spring rate changed configuration with and without drive file iteration as a percentage of base configuration pseudo-damage.

FIGS. 13 and 14 show typical examples of pseudo-damage comparisons made for spindle and body/box mount loads to determine the effect of rig iteration. The baseline severity is that of the base vehicle configuration on the RTS rig (100% of base) and all other changed configurations are shown as deviations from that level. As can be seen from both the spindle load and body/box mount load analyses, the severity observed for the iterated files is not significantly different from that of the non-iterated files. Additionally, the proving ground data are shown for reference against the RTS rig data. As was the case with the proving ground data, the highest deviations from the base rig severity are seen in non-vertical directions, and these directions are not the primary load directions for the components noted.

To accurately compare the interactions of the loads from the three coordinate directions, multi-axial damage sphere analysis was performed for each load-time history. Multi-axial damage "spheres" include damage severity calculations performed at intervals as if a specific geometric configuration and load direction were known. In this case, because the actual geometry is not defined, the damage sphere allows us to compare whether or not the results would be the same if the geometry were defined, and to predict damage severity in that case. The "factor of two" failure criterion was applied to the severity prediction for each configuration in the damage sphere to determine whether a significant difference was observed between the base configuration and changed configuration test runs. In other words, the factor of two failure criterion is applied to the multi-axial damage sphere analysis.

Figure 15:
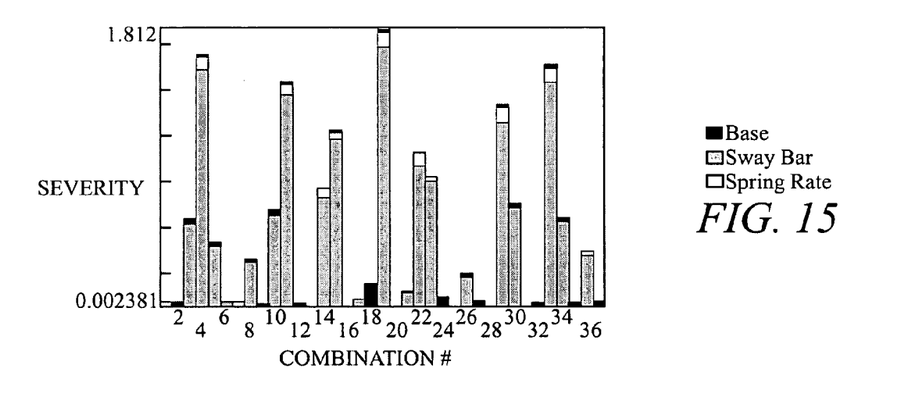
FIG. 15 is a vertical bar graph of spindle load damage spheres for a proving ground data acquisition of a production truck with a base configuration, a sway bar changed configuration, and a spring rate changed configuration.
Figure 16:
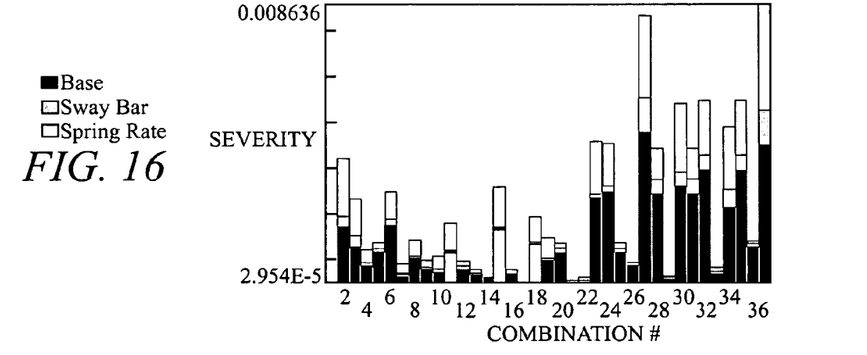
FIG. 16 is a vertical bar graph of body/box mount load damage spheres for a proving ground data acquisition of a production truck with a base configuration, a sway bar changed configuration, and a spring rate changed configuration.

FIGS. 15 and 16 show representative multiaxial damage spheres for both spindle and body/box mount loads from proving ground data acquisition. Those skilled in the art will recognize that FIGS. 15 and 16 are graphical bar charts that plot severity values versus combination numbers, which represent theoretical specific geometric configurations. The spindle loads show very little change in the damage sphere plot for the various suspension configurations, however the body/box mount loads show a greater deal of variability. Nonetheless, the severity numbers for each sphere combination number are still within the "factor of two" failure criterion from the base suspension severity. Additionally, the combinations with the higher severity numbers remain relatively constant for all suspension parameter sets.

Figure 17:
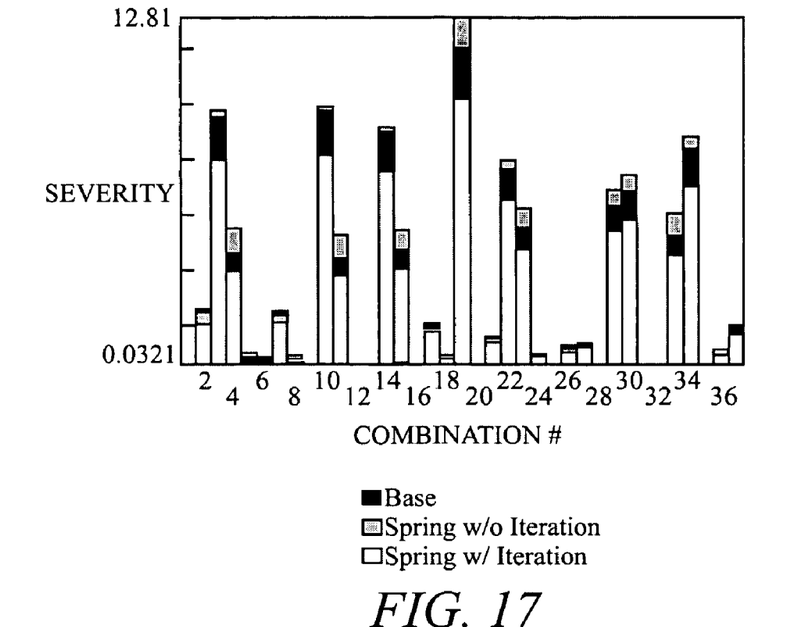
FIG. 17 is a vertical bar graph of spindle load damage spheres for a road test simulation data acquisition of a production truck with a base configuration, a spring rate changed configuration without drive file iteration, and a spring rate changed configuration with drive file iteration.
Figure 18:
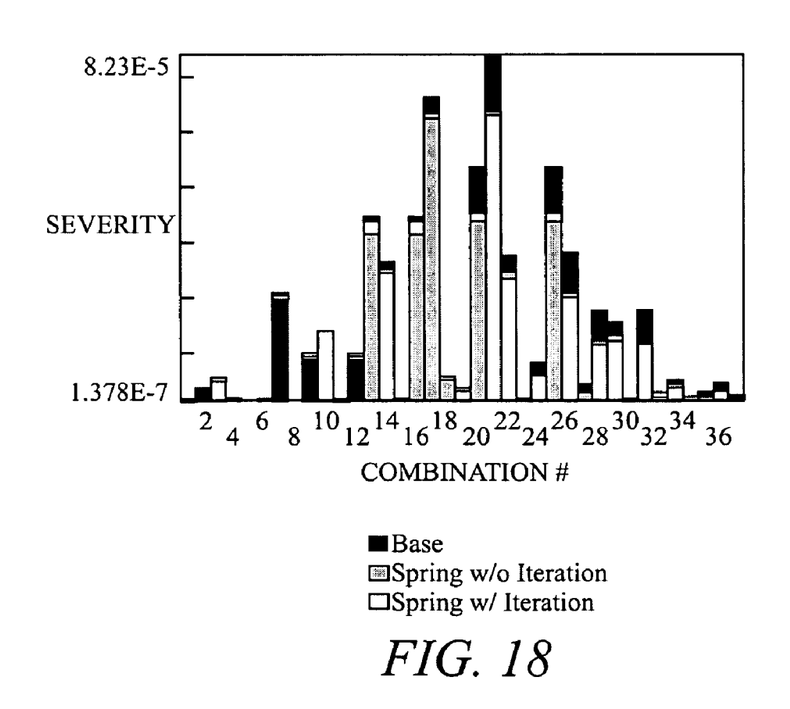
FIG. 18 is a vertical bar graph of body/box mount load damage spheres for a road test simulation data acquisition of a production truck with a base configuration, a spring rate changed configuration without drive file iteration, and a spring rate changed configuration with drive file iteration.

FIGS. 17 and 18 show representative damage spheres for spindle and body/box mount loads for the RTS rig data acquisition. For each combination number the predicted severity values from a combined loading condition in three axes are compared to each other. Applying the "factor of two" criterion to each combination number, it can be seen that there is no significant increase or decrease in damage severity for any of the configurations due to RTS rig iteration. Moreover, the peak damage severity combinations remain substantially constant over the various vehicle configurations. Once again, the body and box mount damage severity comparisons are slightly more erratic, indicating that the compliance of the sheet metal parts may play a factor. However, all damage severity is within a factor of two of the base configuration run, even though there is some variation in which vehicle configuration is the maximum and minimum.

Each of the analyses described above was performed on each observed channel for the proving ground data sets and the RTS rig data sets for each vehicle configuration with the same type of uniform results. In other words, the results from the other observed channels are consistent with the examples set forth in FIGS. 2 through 18. However, any number of channels may be observed and used in comparing the simulated road testing with that of the actual road testing using the above-discussed acceptability criteria.

From the data analyzed above, it is currently believed that the effect of iterating drive files to correlate to base proving ground data after a suspension parameter change has little effect on the load history experienced by the vehicle spindle and body/box mounts. By not iterating the drive files, the load severities experienced at the measured components appeared to be slightly greater on average, but the change was not enough to be considered significant given the inherent variability in fatigue life used to predict damage severity. Additionally, the RTS rig results were compared to the data collected from the proving ground to determine the RTS rig accuracy, and it was concluded that no significant change resulted from the suspension parameter changes investigated for the validation truck.

Therefore, a method has been provided to reliably determine whether to conduct actual road testing, before conducting simulated road testing, of a vehicle, when a change has been requested in a suspension parameter of the vehicle. The method has been applied to and verified by changes to a production truck, and offers potential advantages of cost and time saving in suspension testing by eliminating proving ground road load data acquisition and subsequent drive file development.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the validation vehicle has been described as being a truck, it could instead be a car, van, bus, or the like. Of course, still other modifications and substitutions can be made. The invention is defined by the following claims.

What is claimed is:

1. A method of vehicle suspension testing, the method comprising the steps of:
    conducting actual road testing of a vehicle including collecting data;
    generating a drive file from the collected data for road test simulation;
    changing a parameter of a suspension of the vehicle, thereby resulting in a changed vehicle;
    conducting initial simulated road testing of the changed vehicle using the drive file;
    comparing results from the simulated road testing with results from the actual road testing using acceptability criteria to determine whether to conduct further actual road testing of the changed vehicle before conducting further simulated road testing of the changed vehicle in response to the changed parameter of the suspension; and
    conducting further simulated road testing of the changed vehicle if the acceptability criteria are met, otherwise first conducting further actual road testing of the changed vehicle to develop a new drive file for use with additional simulated road testing of the changed vehicle.

2. The method of claim 1, further comprising the step of performing drive file iteration on the drive file, thereby resulting in an iterated drive file.

3. The method of claim 2, further comprising the step of conducting simulated road testing of the vehicle using the iterated drive file.

4. The method of claim 1, further comprising the step of conducting simulated road testing of the vehicle using the drive file.

5. The method of claim 1, wherein the step of changing a parameter includes changing at least one of rear spring rate, front sway bar diameter, shock valving or damping coefficients, bushing rates or rubber durometer, vehicle corner weights or weight distribution, gross vehicle weight rating, suspension component geometry, or jounce bumper tuning.

6. The method of claim 1, wherein the acceptability criteria include at least one of frequency content of vehicle loading, vehicle load cycles-at-level, relative severity of vehicle loading damage in each coordinate direction, or interaction of each coordinate direction in forming multi-axial loading conditions.

7. The method of claim 6, wherein the acceptability criteria include all of frequency content of vehicle loading, vehicle load cycles-at-level, relative severity of vehicle loading damage in each coordinate direction, or interaction of each coordinate direction in forming multi-axial loading conditions.

8. The method of claim 6, wherein the acceptability criteria include frequency content of vehicle loading using power spectral density analysis.

9. The method of claim 8, wherein the comparing step includes comparing power spectral density data from the simulated road testing with power spectral density data from the actual road testing and determining that the acceptability criteria are at least partially met if maximum power frequencies of the simulated and actual road testing are within about 0.5 Hz.

10. The method of claim 9, wherein the acceptability criteria are further at least partially met if the maximum power frequencies of the simulated and actual road testing follow substantially the same order.

11. The method of claim 6, wherein the acceptability criteria include load cycles-at-level using cumulative exceedance analysis.

12. The method of claim 11, wherein the comparing step includes comparing cumulative exceedance data from the simulated road testing with cumulative exceedance data from the actual road testing and determining that the acceptability criteria are at least partially met if the cumulative exceedance data are within about ten percent.

13. The method of claim 6, wherein the acceptability criteria include load severity using uniaxial pseudo-damage analysis.

14. The method of claim 13, wherein the comparing step includes comparing uniaxial pseudo-damage data from the simulated road testing with uniaxial pseudo-damage data from the actual road testing and determining that the acceptability criteria are at least partially met if the uniaxial pseudo-damage data are within about 50 to 200 percent.

15. The method of claim 6, wherein the acceptability criteria include load severity using multi-axial damage sphere analysis.

16. The method of claim 15, wherein the comparing step includes comparing multi-axial damage sphere data from the simulated road testing with multi-axial damage sphere data from the actual road testing and determining that the acceptability criteria are at least partially met if the multi-axial damage sphere data are within about 50 to 200 percent.

* * * * *